United States Patent [19]
Hergenrother et al.

[11] Patent Number: 4,638,083
[45] Date of Patent: Jan. 20, 1987

[54] ETHYNYL TERMINATED ESTER OLIGOMERS AND POLYMERS THEREFROM

[75] Inventors: Paul M. Hergenrother, Yorktown; Stephen J. Havens, Newport News, both of Va.

[73] Assignee: The United States of America as represented by the Administrator of the National Aeronautics & Space Administration, Washington, D.C.

[21] Appl. No.: 760,797

[22] Filed: Jul. 31, 1985

Related U.S. Application Data

[62] Division of Ser. No. 613,138, May 23, 1984, Pat. No. 4,567,240.

[51] Int. Cl.$^4$ .............................................. C07C 69/76
[52] U.S. Cl. ..................................................... 560/104
[58] Field of Search .......................................... 560/104

[56] References Cited

U.S. PATENT DOCUMENTS

| | | | |
|---|---|---|---|
| 3,149,031 | 9/1964 | Stoffel et al. | 560/104 |
| 3,382,278 | 5/1968 | Schultz et al. | 560/104 |
| 3,645,970 | 2/1972 | Kleiner | 560/104 |
| 3,772,389 | 11/1973 | Lowrance | 560/104 |
| 4,229,368 | 10/1980 | Anderson | 560/104 |
| 4,528,114 | 7/1985 | Petrlilka | 560/104 |

Primary Examiner—Paul J. Killos
Attorney, Agent, or Firm—Wallace J. Nelson; George F. Helfrich; John R. Manning

[57] ABSTRACT

A new class of ethynyl-terminated oligomers and the process for preparing same are disclosed. Upon the application of heat, with or without a catalyst, the ethynyl groups react to provide crosslinking and chain extension to increase the polymer use temperature and improve the polymer solvent resistance. These improved polyesters are potentially useful in packaging, magnetic tapes, capacitors, industrial belting, protective coatings, structural adhesives and composite matrices.

2 Claims, No Drawings

ETHYNYL TERMINATED ESTER OLIGOMERS AND POLYMERS THEREFROM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This is a division of application Ser. No. 613,138, filed May 23, 1984 now U.S. Pat. No. 4,567,240.

BACKGROUND OF THE INVENTION

Polyesters are commercially available and are widely used in a variety of applications such as magnetic tapes, packaging, capacitors, industrial belting, protective coatings, structural adhesives and composite matrices. There are basically three classes of polyesters: amorphous thermoplastics, crystalline or semi-crystalline materials, and unsaturated or crosslinked polymers. Each class of polyesters has a unique set of properties. The synthesis of polyesters is amenable to tailor a material for a particular application. A tremendous amount of work has been reported on polyesters and excellent reviews are available, e.g., I. Goodman "Polyesters," in *Encyclopedia of Polymer Science and Technology* Vol. 11, p. 62 (1969), edited by H. F. Mark and N. G. Gaylord; H. V. Boenig "Unsaturated Polyesters," Ibid., Vol. 11, p. 129 (1969); and P. W. Morgan "Condensation Polymers," Chapter on Polyesters, p, 325, Interscience Publishers, New York (1965).

The amorphous polyesters of the prior art are sensitive to certain solvents especially in a stressed condition and, upon exposure, undergo solvent induced stress crazing and cracking. The crystalline polyesters have better solvent resistance than the amorphous materials but are generally more difficult to process. In addition, the degree of crystallinity in the polymer influences the properties and in many instance, the degree of crystallinity cannot be controlled, especially when processed as adhesives or composite matrices. The crosslinked polyesters undergo pronounced shrinkage upon cure which results in built-in stresses. In addition, these crosslinked polyesters are generally brittle materials and cannot be thermoformed. The materials of this invention exhibit improved solvent resistance, higher use temperature, good toughness, and thermoformability and therby overcome the disadvantages of the prior art.

It is therefore an object of the present invention to provide a novel method for preparing ethynyl-terminated polyesters.

Another object of the present invention is to provide a new composition of matter comprised of ethynyl-terminated ester oligomers and polymers.

A further object of the present invention is to provide novel cured resins in the form of films, coatings, adhesives and composites matrices produced from cured ethynyl-terminated polyesters.

An additional object of the present invention is to provide polymers having improved solvent resistance and use temperature properties.

Another object of the present invention is to provide a process for preparing thermoplastic polyesters having improved solvent resistance and use temperatures without compromising the advantageous thermoformability and toughness property characteristics thereof.

A further object of the present invention is a process for preparing controlled density thermoplastic polyesters to thereby influence the physical properties of the cured material.

BRIEF DESCRIPTION OF THE INVENTION

According to the present invention, the foregoing and additional objects are attained by synthesizing hydroxy-terminated polyarylates (HTPA) with number average molecular weights of approximately 2500, 5000, 7500 and 10,000 and converting these to the corresponding 4-ethynylbenzoyloxy-terminated polyarylates (ETPA) by reaction with 4-ethynylbenzoyl chloride. The terminal ethynyl groups on the resulting ethynyl-terminated ester oligomers or polymers were thermally reacted to provide chain-extension and crosslinking. The cured ETPA exhibited higher glass transition temperatures and better solvent resistance than a high molecular weight linear polyarylate. Solvent resistance was further improved by curing 2,2-bis(4-ethynylbenzoyloxy-4'-phenyl)propane, a coreactant, with the ETPA at concentrations of approximately 10–30% (w/w). The general reaction for reacting hydroxy-terminated oligmers or polymers with ethynyl benzoyl chloride to yield ethynyl-terminated ester oligomers or polymers is illustrated by the general equation:

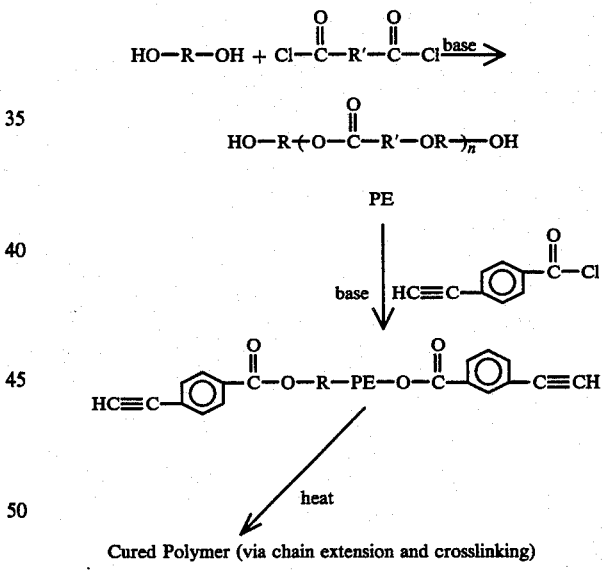

where:
PE refers to the polyester radical portion
n is an integer from 4 to 100 repeat units,
base is an organic base selected from the group consisting of triethylamine, pyridine, quinoline, diethylamine, and piperidine,
R is selected from the group of radicals consisting of

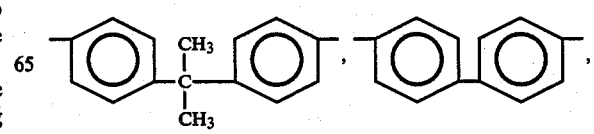

-continued

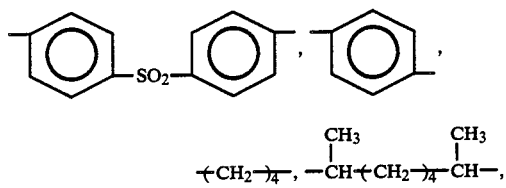

$-(CH_2)_4-$, $-CH(CH_2)_4-CH-$ with $CH_3$ groups, and mixtures thereof
and
R' is selected from the group of radicals consisting of

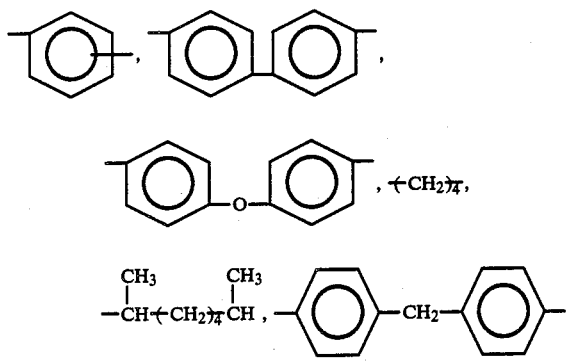

and mixtures thereof.

The molecular weight of the ester oligomer or polymer can be readily controlled which, accordingly, controls the amount of ethynyl groups and, therefore, the crosslink density. High crosslink density provides better solvent resistance, less thermoformability, poorer processability as adhesives or composite matrices, and lower toughness. The synthesis of ethynyl-terminated polyesters can be readily controlled to provide tailored materials for specific applications.

The use of the ethynyl group on the ends of oligomers or polymers to chain extend and crosslink can be readily extended to virtually any polyester to improve the solvent resistance and increase the use temperature. Another advantage derived from this invention is less shrinkage during the cure relative to the more conventional crosslinked polymers.

The crosslink density of the resins obtained from the above reaction can be readily controlled which, accordingly, influences the properties of the cured material. Uncured polyesters terminated with ethynyl groups are soluble in a variety of solvents such as chloroform, N,N-dimethylacetamide, and m-cresol. Solutions thereof can be conveniently used to form coatings, films, adhesive tapes and laminating prepregs and subsequently cured to provide components with better solvent resistance and higher use temperature than comparable conventional polyesters. Also, the cured solvent resistant materials obtained in the above reaction, depending on the molecular weight, are thermoformable and relatively tough unlike the crosslinked solvent resistant conventional polyesters.

The use of 4-ethynylbenzoyl chloride as an end-capping agent for hydroxy-terminated polysulfones is described in Hergenrother's U.S. Pat. No. 4,431,761, issued Feb. 14, 1984. 4-Ethynyl benzoly chloride is potentially used for end-capping any polymer having terminal groups that react with acid chlorides, such as hydroxyl, amine, amide and similar groups. The present invention extends this concept to include polyesters.

Aromatic polyesters (polyarylate) engineering thermoplastic, such as ARDEL ® D-100, a Union Carbide Corporation product, generally exhibit good mechanical properties. This material, unlike the polysulfones, has good retention of physical properties after exposure to UV radiation. However, ARDEL ® D-100 is also solvent sensitive, undergoing solvent induced stress crazing and cracking. In the present invention, to increase the solvent resistance of polyarylates, while retaining their desirable chemical and mechanical properties, ethynyl-terminated polyarylates of various molecular weights were synthesized. These materials were subsequently "cured" by exposure to heat at a sufficiently high temperature to cause crosslinking and/or chain extension.

The starting materials employed in the specific Examples herein were obtained as follows. Methyl 4-bromobenzoate was prepared by refluxing 4-bromobenzoic acid (Aldrich Chemical Company) with an excess of methanol containing a catalytic amount of sulfuric acid. Ethynyltrimethylsilane was purchased from Silar Laboratories, Inc. ARDEL ® D-100 was obtained from Union Carbide Corporation. Methyl 4-[(trimethylsilyl)ethynyl]benzoate and methyl 4-ethynylbenzoate were prepared using procedures similar to those described by W. B. Austin et al in the *Journal of Organic Chemistry* Vol. 46, p. 2280 (1981).

A detailed description for the preparation of all the starting materials is found in an article to appear in the *Journal of Polymer Science,* Polymer Chemistry Edition, Vol. 22, p. 3011 (1984), which is incorporated herein by reference.

Hydroxy-terminated polyarylate (HTPA) polymer synthesis was performed by the reaction of a calculated excess of 2,2-bis(4-hydroxyphenyl)propane with 50/50 1,3-benzenedicarbonyl chloride/1,4-benzenedicarbonyl chloride in ethanol-free chloroform containing a 10% excess of an organic base, e.g., triethylamine. Additional solvents equally applicable to the present invention are methylene chloride and N,N-dimethylacetamide. Also, additional organic bases equally applicable to the present invention include the group consisting of pyridine, quinoline, diethylamine, and piperidine. The reaction was conducted over a period of three hours on a 50 mmol scale at a concentration of 12% (w/v). The chloroform solution was poured into acetone in a blender to precipitate a white solid. The solid was successively washed three times with water, once with methanol, and dried under vacuum at 60° C. for four hours. To convert the recovered HTPA to 4-ethynylbenzoyloxy-terminated polyarylate (ETPA), the HTPA (10 g) was dissolved in chloroform (90 mL) containing 50% excess of triethylamine. Under a nitrogen atmosphere, a solution of 4-ethynylbenzoyl chloride (50% excess) in chloroform (10 mL) was added to the stirred polymer solution. Stirring was continued for three hours and the workup was the same as for the HTPA described above.

The following equation chemically illustrates the described preparation of ETPA.

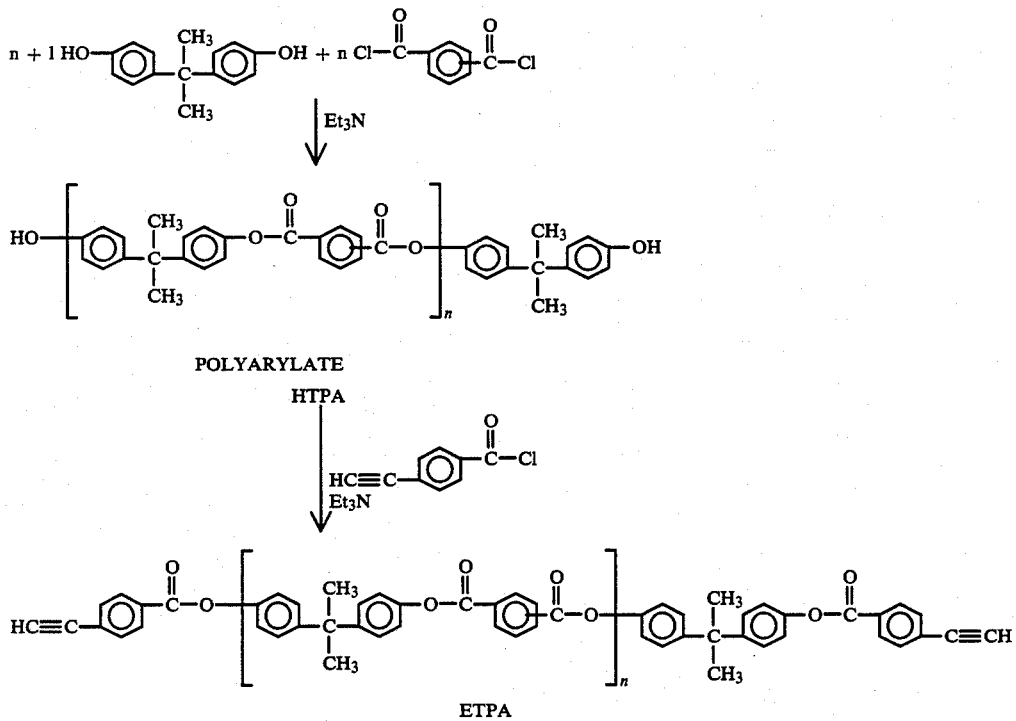

POLYARYLATE
HTPA

ETPA

SPECIFIC EXAMPLES

Example I

Synthesis of a Hydroxy-Terminated Polyarylate with a Molecular Weight of 2500 (2500-$\overline{M}_n$ HTPA)

2,2-Bis(4-hydroxyphenyl)propane (Bisphenol A) (13.7383 g, 0.06018 mole) was dissolved in 150 mL of ethanol-free chloroform containing 16.0 mL (0.1147 mole) of triethylamine. Under a nitrogen atmosphere, a solution of 1,3-benzenedicarbonyl chloride (5.2902 g, 0.02606 mole) and 1,4-benzenedicarbonyl chloride (5.2902 g, 0.02606 mole) dissolved in 50 mL of chloroform was added to the magnetically stirred 2,2-bis(4-hydroxyphenyl)propane solution over a period of ten minutes. The mixture was then stirred at room temperature for three hours and approximately 100 mL of the solvent removed by distillation. The polymer solution was slowly poured into 500 mL of acetone in a blender to precipitate the polymer. The polymer was successively washed three times with water, once with methanol, and dried under vacuum at 60° C. for four hours. Yield of 2500-$\overline{M}_n$ HTPA was 16.06 g (82%).

Example II

Synthesis of a Hydroxy-terminated Polyarylate with a Molecular Weight of 7500 (7500-$\overline{M}_n$ HTPA 2,2-Bis(4-hydroxyphenyl)propane (Bisphenol A) (14.4038 g, 0.06310 mole) was dissolved in 150 mL of ethanol-free chloroform containing 18.4 mL (0.1320 mole) of triethylamine. Under a nitrogen atmosphere, a solution of 1,3-benzenedicarbonyl chloride (6.1057 g, 0.03007 mole) and 1,4-benzenedicarbonyl chloride (6.1057 g, 0.03007 mole) dissolved in 50 mL of chloroform was added to the magnetically stirred 2,2-bis(4-hydroxyphenyl)propane solution over a period of ten minutes. The mixture was then stirred at room temperature for three hours and approximately 100 mL of the solvent removed by distillation. The polymer solution was slowly poured into 500 mL of acetone in a blender to precipitate the polymer. The polymer was successively washed three times with water, once with methanol, and dried under vacuum at 60° C. for four hours. Yield of 7500-$\overline{M}_n$ HTPA was 20.51 g (92%).

Example III

Synthesis of a 4-Ethynylbenzoyloxy-Terminated Polyarylate with a Molecular Weight of 2500 (2500-$\overline{M}_n$ ETPA)

The 2500-molecular weight hydroxy-terminated polyarylate (2500-$\overline{M}_n$ HTPA) (10.00 g, 0.0040 mole) was dissolved in 90 mL of ethanol-free chloroform containing 1.67 mL (0.012 mole) of triethylamine. Under a nitrogen atmosphere, a solution of 4-ethynylbenzoyl chloride (1.98 g, 0.012 mole) dissolved in 10 mL of chloroform was added to the stirred 2500-$\overline{M}_n$ HTPA solution over a period of five minutes. The mixture was then stirred at room temperature for three hours. The polymer solution was slowly poured into 500 mL of acetone in a blender to precipitate the polymer. The polymer was successively washed with 5% sodium bicarbonate solution, twice with water, once with methanol, and dried under vacuum at 60° C. for four hours. Yield of 2500-$\overline{M}_n$ ETPA was 9.66 g (88%).

Example IV

Synthesis of a 4-Ethynylbenzoyloxy-Terminated Polyarylate with a Molecular Weight of 7500 (7500-$\overline{M}_n$ ETPA)

The 7500-molecular weight hydroxy-terminated polyarylate (7500-$\overline{M}_n$ HTPA) (10.00 g, 0.00133 mole) was dissolved in 90 mL of ethanol-free chloroform containing 0.56 mL (0.0040 mole) of triethylamine. Under a nitrogen atmosphere, a solution of 4-ethynylbenzoyl chloride (0.66 g, 0.0040 mole) dissolved in 10 mL of chloroform was added to the stirred 7500-$\overline{M}_n$ HTPA solution over a period of five minutes. The mixture was then stirred at room temperature for three hours. The polymer solution was slowly poured into 500 mL of acetone in a blender to precipitate the polymer. The polymer was successively washed with 5% sodium bicarbonate solution, twice with water, once with methanol, and dried under vacuum at 60° C. for four hours. Yield of 7500-$\overline{M}_n$ ETPA was 9.83 g (95%).

Additional Examples included the preparation of HTPA with a calculated $\overline{M}_n$ of 5000 and 10,000, prepared as shown in the equation above and subsequently converted to ETPA by reaction with 4-ethynylbenzoyl chloride. Characterization of the HTPA, the ETPA and ARDEL ® D-100 is given in the Table below. As shown therein, GPC peak retention times continuously decreased with increasing $\overline{M}_n$. $\overline{M}_n$ of ARDEL ® D-100 is approximately 24,000.

$T_g$s determined by DSC and TBA differed somewhat although the basic trends are the same. The $T_g$s of the HTPA initially increased with increasing molecular weight, then leveled off at $\overline{M}_n$=7500. The $T_g$s of the thermally reacted ETPA decreased with increasing molecular weight due to lower crosslink density. A small peak at 3280–3290 cm$^{-1}$ in the infrared spectra of the ETPA due to C≡C—H stretching was not seen in the thermally reacted material.

vided chain-extension and/or crosslinking during the cure thereby increasing its effective molecular weight. Film specimens of the cured ETPA and ARDEL ® were tested with a variety of solvents. All samples were resistant to ethylene glycol (deicing fluid) and to JP-4 (jet fuel) after 24 hours immersion under stress. Stress was applied to a film specimen by bending the small strip back upon itself. ARDEL ® failed almost immediately on immersion in tricresyl phosphate (hydraulic fluid) and the 10,000-$\overline{M}_n$ ETPA failed after several minutes, but the lower molecular weight ETPA specimens were intact after 24 hours. In chloroform, ARDEL ® dissolved and the higher molecular weight ETPA were swollen after ten minutes. Under the same conditions only very slight swelling was observed in the cured 2500-$\overline{M}_n$ ETPA.

It is desirable to incorporate into one material the good mechanical properties of ARDEL ® and the higher molecular weight ETPA and the good solvent resistance of the lower molecular weight ETPA with its high crosslink density. One approach is through the use of a reactive plasticizer. A material thought to be compatible with the ETPA was synthesized by reaction of 4-ethynylbenzoyl chloride with 2,2-bis(4-hydroxyphenyl)propane to obtain

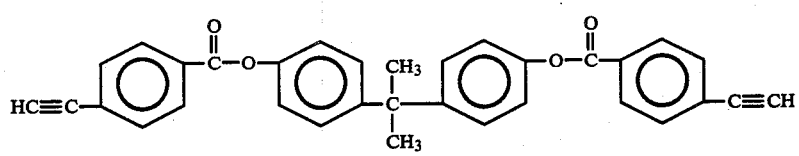

2,2-Bis(4-ethynylbenzoyloxy-4'-phenyl)propane

CHARACTERIZATION OF HYDROXY-TERMINATED POLYARYLATES, 4-ETHYNYLBENZOYLOXY-TERMINATED POLYARYLATES, AND ARDEL ® D-100

| Approximate $\overline{M}_n$ (g/mol) | Substituent | $\eta_{inh}$[b] (dL/g) | GPC[c] Peak Retention Time (min) | $T_g$ of Cured Polyarylates (°C.) TBA[e] | | | Cured Films $T_g$ (°C.) | | Chloroform Solubility |
|---|---|---|---|---|---|---|---|---|---|
| | | | | DSC[d] | Heat-Up | Cool-Down | DSC[d] | TMA[f] | |
| 2500 | —OH* | 0.24 | 18.68 | 178 | 177 | 203 | 184 | — | Soluble |
| 2500 | HC≡C—C$_6$H$_4$CO$_2$ | 0.30 | 18.53 | 218 | 181 | 237 | 214 | 212 | Very Slight Swelling |
| 5000 | —OH | 0.33 | 18.26 | 191 | 190 | 205 | 185 | — | Soluble |
| 5000 | HC≡C—C$_6$H$_4$CO$_2$ | 0.34 | 18.23 | 215 | 190 | 230 | 208 | 212 | Slight Swelling |
| 7500 | —OH | 0.41 | 17.86 | 197 | 196 | 210 | 190 | 194 | Soluble |
| 7500 | HC≡C—C$_6$H$_4$CO$_2$ | 0.42 | 17.86 | 207 | 195 | 230 | 205 | 210 | Swelling |
| 10,000 | —OH | 0.43 | 17.45 | 197 | 196 | 210 | 191 | 196 | Soluble |
| 10,000 | HC≡C—C$_6$H$_4$CO$_2$ | 0.47 | 17.45 | 203 | 196 | 227 | 196 | 206 | Swelling |
| 24,000[a] (ARDEL ®) D-100 | — | 0.59 | 17.21 | 197 | 196 | 208 | 193 | 196 | Soluble |

[a]Information provided by Union Carbide Corporation, Bound Brook, New Jersey (H. Gardner).
[b]Inherent viscosity, 0.5% solution in chloroform at 25° C.
[c]Gel permeation chromatography using μ-Styragel (10$^6$, 10$^5$, 10$^4$, 10$^3$ Å), chloroform as solvent.
[d]Differential scanning calorimetry at heating rate of 20° C./min.
[e]Torsional braid analysis at heating rate of 3° C./min.
[f]Thermal mechanical analysis at heating rate of 5° C./min.

All the uncured polyarylates in the Table were soluble at concentrations of 20% (w/v) in chloroform and in m-cresol. Films were cast from m-cresol solution and cured to a final temperature of 250° C. in flowing air. Higher cure temperatures were not used due to the possibility of degrading the polymer. The 2500 and 5000-$\overline{M}_n$ HTPA did not form usable films. The film obtained from the 2500-$\overline{M}_n$ ETPA was too badly cracked for mechanical test specimens to be cut, but smaller specimens for TMA and solvent testing could be obtained. Reaction of the ethynyl group had pro- 4-Ethynylbenzoyl chloride (2.72 g, 16.5 mol) was added to a stirred solution of 2,2-bis(4-hydroxyphenyl)propane (1.71 g, 7.5 mmol) in 15 mL of dry pyridine. After stirring overnight, the mixture was added to 500 mL of 5% hydrochloric acid to precipitate a solid. The solid was stirred with 10% sodium bicarbonate solution, collected by filtration, and allowed to air dry. Recrystallization from an 80/20 ethanol/chloroform mixture provided 2,2-bis(4-ethynylbenzoyloxy-4'-phenyl)propane (2.39 g, 66% yield) as light yellow needles, mp 182°–183° C.; IR(KBr) 3280 and 3245 (m, sharp, C≡CH), 2110 (vw, C≡CH), 1730 (vs, ester C=O) cm$^{-1}$. 'H NMR (CDCl$_3$) δ 1.70 (s, 6, CH$_3$), 3.25 (s, 2, C≡CH), 7.1–8.5 (m, 16, aromatic).

Anal, Calcd for C$_{33}$H$_{24}$O$_4$: C, 81.80; H, 4.99. Found: C, 81.97; H, 5.07.

The DSC curve of this 2,2-bis(4-ethynylbenzoyloxy-4'-phenyl)propane showed a sharp exotherm at 219° C. due to reaction of ethynyl groups that occurred soon after melting. A DSC curve of the reacted material showed no melting endotherm, indicating essentially complete reaction of the ethynyl groups. The melting point of this material is slightly below the T$_g$s of the uncured ETPA and should be miscible with the polymers. A thermally reacted mixture of 10% 2,2-bis(4-ethynylbenzoyloxy-4'-phenyl)propane with an ETPA ($\overline{M}_n$=7500) produced a material with a T$_g$ of 214° C., 7° C. higher than for the cured ETPA alone. A cured film of the same composition was tough and highly flexible yet swelled only very slightly on exposure to chloroform for 10 minutes.

The thermally induced reaction of the ethynyl group on ester oligomers or polymers begins at about 200° C. and reaches a maximum rate in the 250°–350° C. range. The reaction only proceeds at a moderate or fast rate at a temperature above the glass transition temperature of the oligomer or polymer. At a temperature less than the T$_g$, the material is in the glassy state where there is essentially no segmental molecular mobility. ETPA films cured for 0.5 hour at 250° C. in circulating air showed no residual ethynyl groups by Fournier transform infrared spectroscopy indicating complete reaction.

Thus, the synthesis of various molecular weight ethynylbenzoyloxy-terminated polyarylates and the improved characteristics thereof for use as composite matrices and the like has been clearly demonstrated. The thermally induced reaction of the ethynyl groups results in modified crosslinked polyarylates having higher T$_g$s and improved solvent resistance when compared with exemplary uncrosslinked polyarylates, e.g., ARDEL® D-100. Although the molding properties of the ETPA were good only when the T$_m$ of the uncured ETPA was relatively low, the mechanical properties of cured films of the ETPA were essentially equal to that of ARDEL® D-100. Also, the thermal stabilities as determined by TGA were similar for ETPA and ARDEL® D-100.

Although the invention has been described relative to specific examples, it is not so limited, and numerous variations and modifications thereof will be readily apparent to those skilled in the art without departing from the spirit or scope of the invention as set forth in the appended claims. It is therefore to be understood that the invention may be practiced otherwise than as specifically described.

What is claimed as new and desired to be secured by Letters Patent of the United States is:

1. A method of preparing 2-2-bis(4-ethynylbenzoyloxy-4'-phenyl)propane comprising:
    adding 4-ethynylbenzoyl chloride to a stirred solution of 2,2-bis(4-hydroxyphenyl)propane in dry pridine,
    stirring this mixture approximately twelve hours and precipitating the mixture in a 5% solution of hydrochloric acid,
    combining the solid precipitate with a 10% sodium bicarbonate solution,
    collecting the solid by filtration and air drying the recovered solid,
    recrystallization the solid from a 80/20 ethanol/chloroform mixture to recover light yellow needle crystals of 2,2-bis(4-ethynylbenzoyloxy-4-phenyl)propane.

2. The method of claim 1 wherein the molar ratio of the raw ingredients comprise:
    16.5 mole 4-ethynylbenzoyl chloride,
    7.5 mmole 2,2-bis(4-hydroxyphenyl)propane, and
    the recovered yield of 2,2-bis(4-hydroxyphenyl)propane is 66%.

* * * * *